(12) United States Patent
Kamizuru et al.

(10) Patent No.: US 12,477,840 B2
(45) Date of Patent: Nov. 18, 2025

(54) CONTROL CIRCUIT AND DISTANCE MEASURING SYSTEM

(71) Applicant: Sony Semiconductor Solutions Corporation, Kanagawa (JP)

(72) Inventors: Hayato Kamizuru, Kagoshima (JP); Daisuke Hirono, Kanagawa (JP)

(73) Assignee: Sony Semiconductor Solutions Corporations, Kanagawa (JP)

( * ) Notice: Subject to any disclaimer, the term of this patent is extended or adjusted under 35 U.S.C. 154(b) by 1116 days.

(21) Appl. No.: 17/434,902

(22) PCT Filed: Dec. 13, 2019

(86) PCT No.: PCT/JP2019/048841
§ 371 (c)(1),
(2) Date: Aug. 30, 2021

(87) PCT Pub. No.: WO2020/179180
PCT Pub. Date: Sep. 10, 2020

(65) Prior Publication Data
US 2022/0059716 A1 Feb. 24, 2022

(30) Foreign Application Priority Data
Mar. 5, 2019 (JP) .............................. JP2019-039791

(51) Int. Cl.
*G01J 1/42* (2006.01)
*G01S 7/4863* (2020.01)
(Continued)

(52) U.S. Cl.
CPC .............. *H10F 30/225* (2025.01); *G01J 1/42* (2013.01); *G01S 7/4863* (2013.01); *G01S 17/08* (2013.01); *G01S 17/89* (2013.01)

(58) Field of Classification Search
CPC ........ G01S 7/4863; G01S 17/08; G01S 17/89; G01J 1/42; H10F 30/225
See application file for complete search history.

(56) References Cited

U.S. PATENT DOCUMENTS 12,052,507 B2 * 7/2024 Ota ........................ H04N 25/57
2011/0266420 A1 11/2011 Eldesouki
(Continued)

FOREIGN PATENT DOCUMENTS

CN 107063452 A 8/2017
CN 107941248 A 4/2018
(Continued)

OTHER PUBLICATIONS

International Search Report (PCT/ISA/210), International Application No. PCT/JP2019/048841, dated Feb. 7, 2020.
(Continued)

*Primary Examiner* — Kevin K Pyo
(74) *Attorney, Agent, or Firm* — Michael Best & Friedrich LLP (57) ABSTRACT

The control circuit according to the present disclosure includes a passive circuit (10) and an active circuit (20). The passive circuit (10) is configured to: supply current to a Single Photon Avalanche Diode (SPAD) element (6a) from a supply path (Rp); and output a first pulse signal (P1) according to a signal Generated in the SPAD element (6a). The active circuit (20) is configured to: supply current to the SPAD element (6a) selectively from among a plurality of supply paths; and output a second pulse signal (P2) according to a signal generated in the SPAD element (6a).

18 Claims, 6 Drawing Sheets

(51) Int. Cl.
  *G01S 17/08* (2006.01)
  *G01S 17/89* (2020.01)
  *H10F 30/225* (2025.01)

(56) References Cited

U.S. PATENT DOCUMENTS

| | | | |
|---|---|---|---|
| 2017/0131143 | A1 | 5/2017 | Andreou et al. |
| 2018/0209846 | A1 | 7/2018 | Mandal et al. |
| 2018/0259629 | A1 | 9/2018 | Oohata |
| 2022/0026541 | A1* | 1/2022 | Ozawa ................ H03K 17/941 |

FOREIGN PATENT DOCUMENTS

| | | |
|---|---|---|
| CN | 108139268 A | 6/2018 |
| CN | 108431626 A | 8/2018 |
| CN | 109115334 A | 1/2019 |
| CN | 109116369 A | 1/2019 |
| JP | H11-041070 A | 2/1999 |
| JP | 2014081254 A | 5/2014 |
| JP | 2018179732 A | 11/2018 |
| WO | WO-2018091638 A1 | 5/2018 |

OTHER PUBLICATIONS

Notification of Transmittal of the International Search Report and the Written Opinion of the International Searching Authority, or the Declaration (PCT/ISA/220), International Application No. PCT/JP2019/048841, dated Feb. 18, 2020.

Written Opinion of the International Search Authority (PCT/ISA/237), International Application No. PCT/ JP2019/048841, dated Feb. 18, 2020.

Zhang Chaignian, et al, "Study of Single-photon Detection Based on the Linear Array APD", Computer Measurement &Control, vol. 24, No. 09, Sep. 30, 2016, pp. 184-187.

Xie Gang, et al, "A Single-Photon TOF Sensor Pixel Based on SMIC 0.13μm CIS Technology", Semiconductor Optoelectronics, vol. 39, No. 01, Feb. 28, 2018, pp. 42-46.

* cited by examiner

CONTROL CIRCUIT AND DISTANCE MEASURING SYSTEM

FIELD

The present disclosure relates to a control circuit and a distance measuring system.

BACKGROUND

There has been known a distance measuring technique that is called a direct Time-of-Flight (ToF) method as one of distance measuring methods for measuring, with the use of light, a distance up to an object to be measured. In the above-mentioned direct ToF method, a light receiving element receives reflected light of light having been emitted from a light source which is reflected from an object to be measured so as to measure a distance up to a target on the basis of a time interval from emission of the light until reception of the reflected light (see Patent Literature 1, for example).

CITATION LIST

Patent Literature

Patent Literature 1: JP 2014-081254 A

SUMMARY

Technical Problem

However, in the above-mentioned conventional technology, when a Single Photon Avalanche Diode (SPAD) element receives again reflected light at interval shorter than a dead time of the SPAD element that is used as a light receiving element, detection of the above-mentioned following reflected light is difficult.

Furthermore, in the above-mentioned conventional technology, a dynamic range of a distance measuring system is rate-controlled by a dead time of the SPAD element. Therefore, it is difficult to enlarge a dynamic range of the distance measuring system unless a dead time of the SPAD element is short.

Therefore, in the present disclosure, there are proposed a control circuit and a distance measuring system capable of enlarging a dynamic range.
SPAD element is shortened.

Solution to Problem

According to the present disclosure, there is provided a control circuit. The control circuit includes a passive circuit and an active circuit. The passive circuit is configured to: supply current to a Single Photon Avalanche Diode (SPAD) element from a single supply path; and output a first pulse signal according to a signal generated in the SPAD element. The active circuit is configured to: supply current to the SPAD element selectively from among a plurality of supply paths; and output a second pulse signal according to a signal generated in the SPAD element.

Advantageous Effects of Invention

According to the present disclosure, it is possible to enlarge a dynamic range. It is noted that the above effects are not necessarily limited, and, along with or instead of the above effects, any of the effects described in the present specification or other effects which can be understood from the present specification may be exhibited.

DESCRIPTION OF EMBODIMENTS

Hereinafter, embodiments according to the present disclosure will be specifically explained with reference to accompanying drawings. In the following embodiments, the same part is provided with the same reference symbol so as to avoid duplicated explanation.

As one of distance measuring methods for measuring, by using light, a distance up to an object to be measured, there has been known a distance measuring technique that is referred to as a direct ToF method. In the above-mentioned direct ToF method, reflected light that is reflected from an object to be measured, which has been emitted from a light source, is received by a light receiving element, and a distance up to a target is measured on the basis of a time interval from emission of light up to reception of the light as reflected light.

However, in the above-mentioned conventional technology, when a Single Photon Avalanche Diode (SPAD) element receives again reflected light at interval shorter than a dead time of the SPAD element that is used as a light receiving element, detection of the above-mentioned following reflected light is difficult.

Furthermore, in the above-mentioned conventional technology, a dynamic range of a distance measuring system is rate-controlled by a dead time of the SPAD element. Therefore, it is difficult to enlarge a dynamic range of the distance measuring system unless a dead time of the SPAD element is shortened.

The above-mentioned dead time of the SPAD element is decided by a value of current supplied to the SPAD element, and when a value of the above-mentioned supplied current is increased, the dead time of the SPAD element is able to be shortened.

On the other hand, when a value of current supplied to an SPAD element is too large, there may occur a negative effect that avalanche amplification having occurred in the SPAD element does not stop when the SPAD element receives light.

Thus, there has been desired achievement of a control circuit and a distance measuring system capable of overcoming the above-mentioned problem and enlarging a dynamic range.

Distance Measuring Method

The present disclosure relates to a technology for measuring a distance with the use of light. For convenience of explanation of embodiments according to the present disclosure, with reference to FIGS. 1 and 2, a distance measuring method to be applied to the embodiments will be explained.

Figure 1:
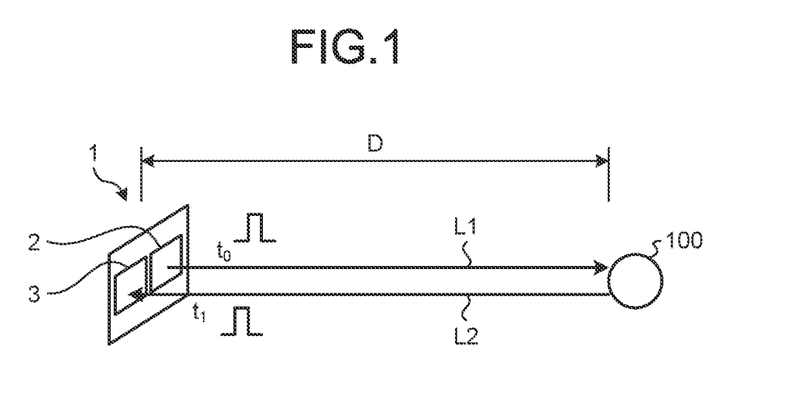
FIG. 1 a schematic diagram illustrating distance measurement by a direct ToF method to be applied to embodiments according to the present disclosure.

FIG. 1 is a schematic diagram illustrating distance measurement by a direct ToF method to be applied to the embodiments according to the present disclosure. In the embodiments, a direct ToF method is employed as a distance measuring method.

In the above-mentioned direct ToF method, a receiving unit 3 receives reflected light L2 of the emission light L1 having been emitted from a light source unit 2 which is reflected from an object to be measured 100, so as to measure a distance on the basis of a difference time interval between a light emitting timing and a receiving timing.

A distance measuring device 1 includes the light source unit 2 and the light receiving unit 3. The distance measuring device 1 one example of a distance measuring system. The light source unit 2 includes a light source 4 (see FIG. 3) such as a laser diode, and is driven so as to emit laser light in a pulse form.

The emission light L1 emitted from the light source unit 2 is reflected from the object to be measured 100 to be received by the light receiving unit 3 as the reflected light L2. The light receiving unit 3 includes a pixel array unit 6 (see FIG. 3) that converts light into an electrical signal by photoelectric conversion, so as to output a signal according to received light.

A time point (light emitting timing) is defined as a time point at which the light source unit 2 emits light, and a time point (light receiving timing) is defined as a time point $t_1$ at which the light receiving unit 3 receives the reflected light L2 of the emission light L1 having been emitted from the light source unit 2 which is reflected from the object to be measured 100.

When a constant number c is defined as the speed of light ($2.9979 \times 10^8$ [m/sec]), a distance D between the distance measuring device 1 and the object to be measured 100 is calculated by the following formula (1).

$$D=(c/2) \times (t_1-t_0) \qquad (1)$$

The distance measuring device 1 may repeatedly execute the above-mentioned process at a plurality of times. The light receiving unit 3 may include a plurality of SPAD elements 6a (see FIG. 4), and the distance D may be individually computed on the basis of a light receiving timing at which each of the SPAD elements 6a receives the reflected light L2.

Figure 2:
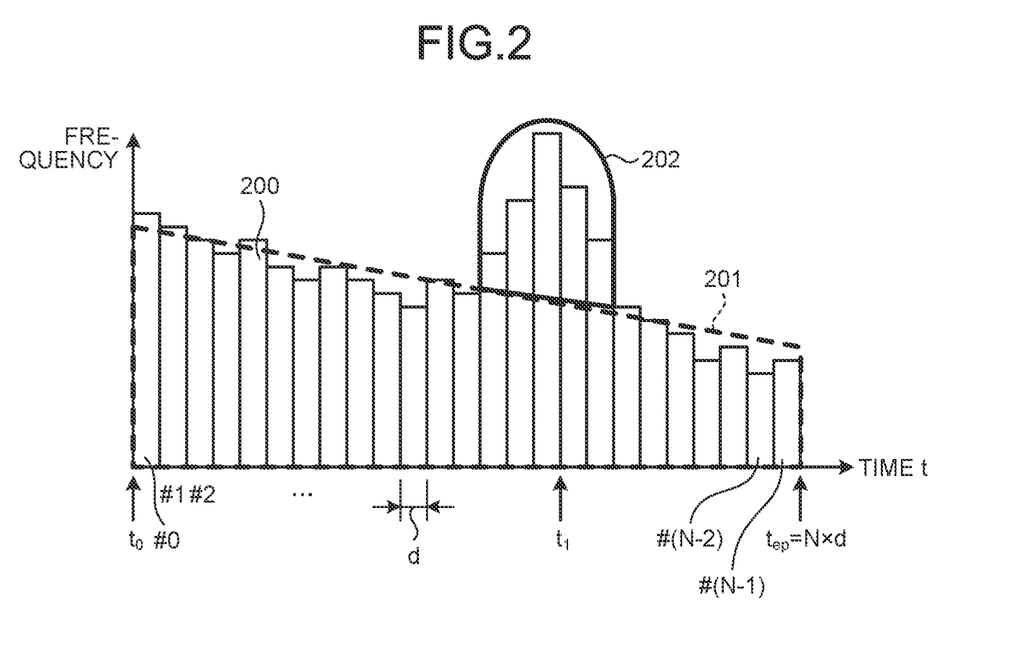
FIG. 2 is a histogram illustrating one example based on a time point at which a light receiving unit to be applied to the embodiments according to the present disclosure receives light.

The distance measuring device 1 classifies, on the basis of bins, a time interval $t_m$ (hereinafter, may be referred to as "light receiving time interval $t_m$,") from the time point $t_0$ of a light emitting timing until a light receiving timing at which the light receiving unit 3 receives light, so as to generate a histogram.

FIG. 2 is a histogram illustrating one example based on a time point at which the light receiving unit 3 to be applied to the embodiments according to the present disclosure receives light. In FIG. 2, a lateral axis indicates a bin, and a vertical axis indicates a frequency for each bin. A bin is obtained by classifying the light receiving time interval $t_m$ for each predetermined unit time interval d.

Specifically, a bin #0 satisfies $0 \le t_m < d$, a bin #1 satisfies $d \le t_m < 2 \times d$, a bin #2 satisfies $2 \times d \le t_m < 3 \times d$, . . . , a bin #(N−2) satisfies $(N-2) \times d \le t_m < (N-1) \times d$. When an exposure time interval of the light receiving unit 3 is defined as a time interval $t_{ep}$, there is satisfied $t_{ep} = N \times d$.

The distance measuring device 1 counts, on the basis of a bin, the number of acquisition times of the light receiving time interval $t_m$, and obtains a frequency 200 for each bin so as to generate a histogram. Herein, the light receiving unit 3 receives light other than the reflected light L2 that is the reflected light of the emission light L1 emitted from the light source unit 2.

For example, as an example of light other than the reflected light L2 to be a target, there presents ambient light in the periphery of the distance measuring device 1. The above-mentioned ambient light is light that is made incident on the light receiving unit 3 at random, and an ambient light component 201 in a histogram due to ambient light becomes noise for the reflected light L2 to be a target.

On the other hand, the reflected light L2 to be a target is light that is received in accordance with a specific distance, and appears as an active light component 202 in a histogram. A bin corresponding to a frequency of a peak in the active light component 202 is a bin corresponding to the distance D of the object to be measured 100.

The distance measuring device 1 acquires, as the above-mentioned time point $t_1$, a representative time point (for example, time point at center of bin) of the bin to be able to compute the distance D up to the object to be measured 100 in accordance with the above-mentioned formula (1). As described above, by using a plurality of light reception results, it is possible to execute appropriate distance measurement in spite of random noise.

Configuration of Distance Measuring Device

Figure 3:
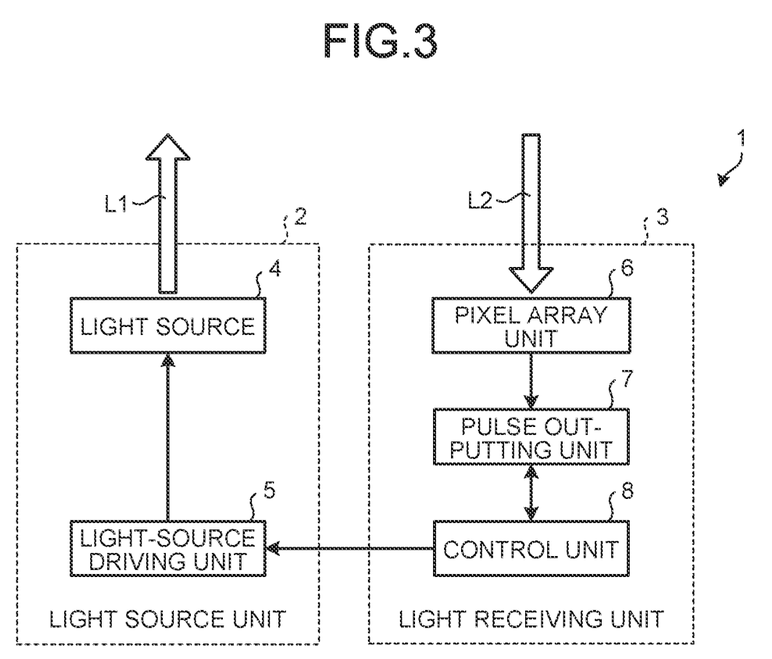
FIG. 3 is a block diagram illustrating a configuration example of a distance measuring device according to the embodiments of the present disclosure.

Next, a configuration of the distance measuring device 1 according to the embodiments will be explained with reference to FIGS. 3 and 4. FIG. 3 is a block diagram illustrating a configuration example of the distance measuring device 1 according to the embodiments of the present disclosure. As described above, the distance measuring device 1 includes the light source unit 2 and the light receiving unit 3.

The light source unit 2 includes the light source 4 and a light-source driving unit 5. The light source 4 is constituted of a laser diode such as a Vertical Cavity Surface Emitting LASER (VCSEL). For the light source 4, not limited to the VCSEL, a laser diode array in which laser diodes are arrayed on a line and the like may be employed.

The light-source driving unit 5 drives the light source 4. The light-source driving unit 5 drives the light source 4 such that the emission light L1 having a predetermined timing and a predetermined pulse width is emitted from the light source 4 on the basis of a light-emission control signal transmitted from a control unit 8 of the light receiving unit 3, for example.

The light-source driving unit 5 is capable of driving the light source 4 such that by using laser light emitted from the light source 4 including laser diodes arrayed in a line, scanning is performed in a direction perpendicular to the line, for example.

The light receiving unit 3 includes the pixel array unit 6, a pulse outputting unit 7, and the control unit 8.

The pixel array unit 6 includes the plurality of SPAD elements 6a (see FIG. 4) arrayed in a two-dimensional grid. The above-mentioned SPAD element 6a applies, to a cathode, a large reverse bias voltage generated by avalanche multiplication, and the avalanche multiplication occurs therein caused by electrons generated in response to incidence of a single photon.

In other words, the SPAD element 6a has a characteristic that a large current flows therethrough in response to incidence of a single photon. By using the above-mentioned characteristic, the SPAD element 6a is capable of detecting incidence of a single photon included in the reflected light L2 with a high sensitivity.

Operation of the plurality of SPAD elements 6a in the pixel array unit 6 is controlled by the control unit 8. For example, the control unit 8 is capable of controlling reading out of a signal from each of the SPAD elements 6a, for each block including the n×m SPAD elements 6a constituted of n pixels in a row direction multiplied by m pixels in a column direction.

For each of the blocks as a unit, the control unit 8 scans the SPAD elements 6a in a row direction and further executes scanning in a column direction for each row to be able to read out signals from the SPAD elements 6a.

Note that in the embodiments, the control unit 8 may individually reads out a signal from each of the SPAD elements 6a. Signals generated in the SPAD elements 6a in the pixel array unit 6 are supplied to the pulse outputting unit 7.

In response to signals generated in the SPAD elements 6a, the pulse outputting unit 7 outputs, as a digital signal, a predetermined pulse signal to the control unit 8. Details of the above-mentioned pulse outputting unit 7 will be mentioned later.

The control unit 8 controls whole operation of the distance measuring device 1 in accordance with a preliminarily-implemented program, for example. The control unit 8 controls the light-source driving unit 5 so as to control a light emitting timing of the light source 4, for example.

The control unit 8 generates a histogram illustrated in FIG. 2 on the basis of pulse signals output from the pulse outputting unit 7. The control unit 8 executes a predetermined operation process on the basis of data on the generated histogram, so as to compute the distance D up to the object to be measured 100.

Figure 4:
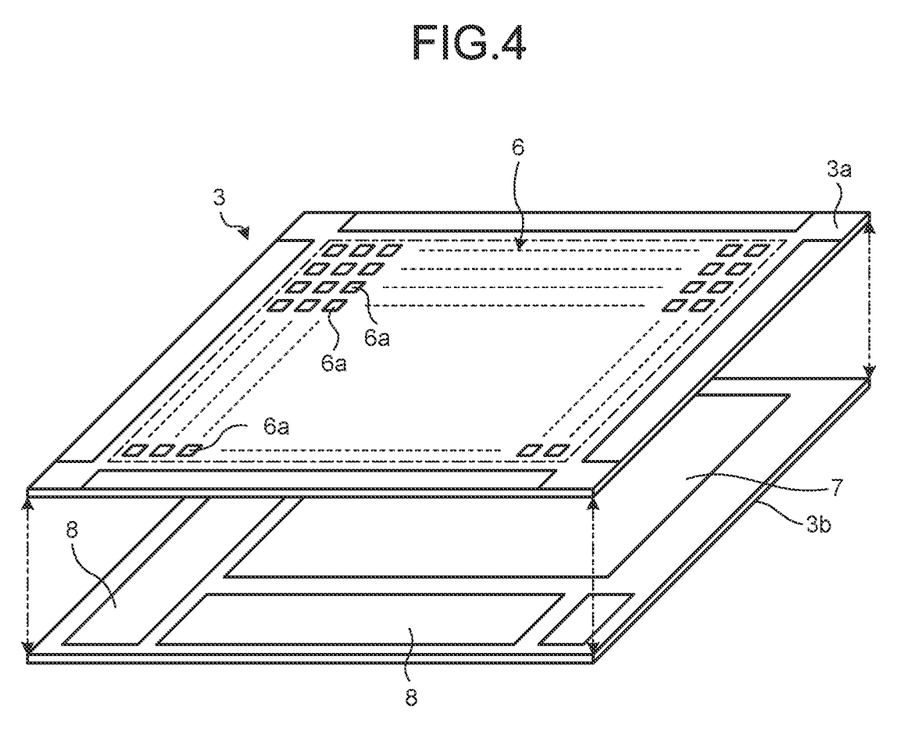
FIG. 4 is a schematic diagram illustrating a configuration of a device to be applied to a light receiving unit according to the embodiments of the present disclosure.

FIG. 4 is a schematic diagram illustrating a configuration of a device to be applied to the light receiving unit 3 according to the embodiments of the present disclosure. In FIG. 4, the light receiving unit 3 is constituted of a light receiving tip 3a and a logic tip 3b that are laminated, each of which is constituted of a semiconductor chip. In FIG. 4, for convenience of explanation, the light receiving tip 3a and the logic tip 3b are illustrated in a separated state.

In the light receiving tip 3a, the SPAD elements 6a are arrayed in a two-dimensional grid in a region of the pixel array unit 6. The logic tip 3b is provided with the pulse outputting unit 7 and the control unit 8. Note that configurations of the light receiving tip 3a and the logic tip 3b are not limited to the example illustrated in FIG. 4.

Configuration and Operation of Pulse Outputting Unit

Figure 5:
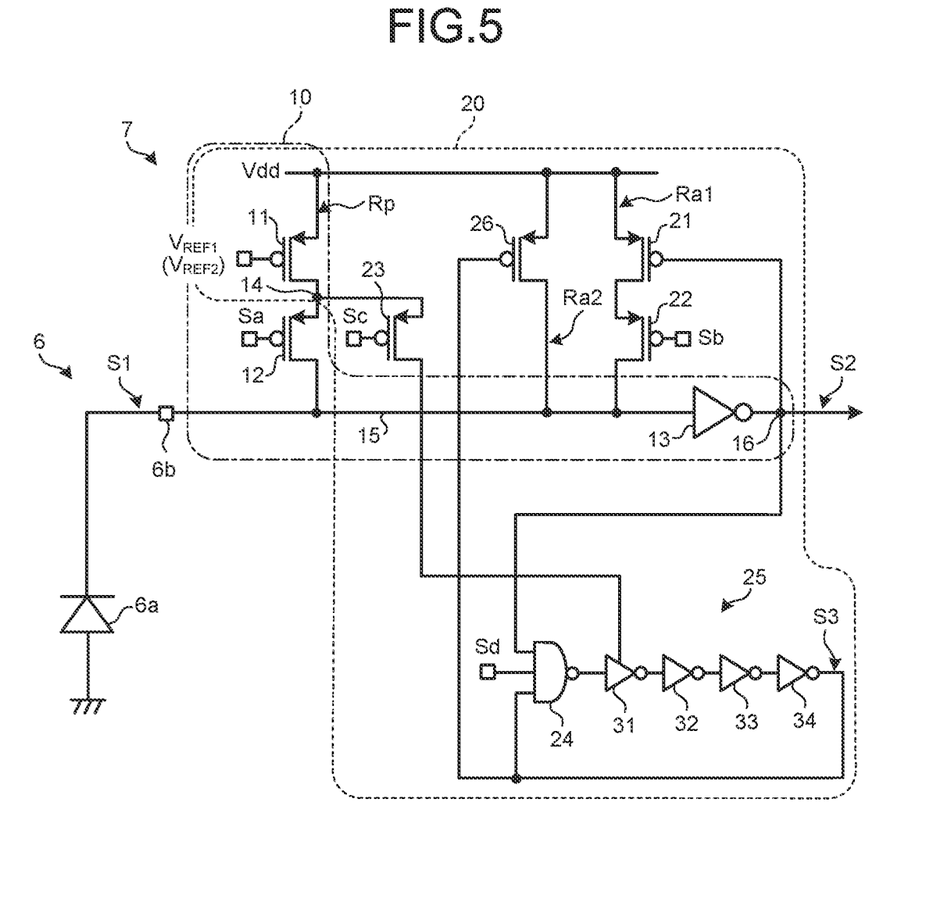
FIG. 5 is a circuit diagram illustrating a configuration example a pulse outputting unit according to the embodiments of the present disclosure.

Next, a configuration and operation of the pulse outputting unit 7 according to the embodiments will be explained with reference to FIGS. 5 to 9. FIG. 5 is a circuit diagram illustrating a configuration example the pulse outputting unit 7 according to the embodiments of the present disclosure.

As illustrated in FIG. 5, the pulse outputting unit 7 includes a passive circuit 10 and an active circuit 20. One of the above-mentioned passive circuit 10 and the above-mentioned active circuit 20 that is selected by the control unit 8 operates in accordance with a control signal transmitted from the control unit 8.

Thus, a configuration and operation of the passive circuit 10 will be first explained. The passive circuit 10 includes a P-type transistor 11, a P-type transistor 12, and an inverter 13.

A source of the P-type transistor 11 is connected to a power source voltage Vdd, and a drain of the P-type transistor 11 is connected to a node 14. A source of the P-type transistor 12 is connected to the node 14, and a drain of the P-type transistor 12 is connected to a signal line 15.

The above-mentioned signal line 15 connects between a cathode of the SPAD element 6a and an input terminal of the inverter 13 via a connector 6b of the pixel array unit 6. An anode of the SPAD element 6a is grounded, and an output terminal of the inverter 13 is connected to the control unit 8 (see FIG. 3) via a node 16.

When the passive circuit 10 instead of the active circuit 20 is selected, the control unit 8 inputs a predetermined first reference voltage $V_{REF1}$ to a gate of the P-type transistor 11, and further inputs a low-level selection signal Sa to a gate the P-type transistor 12.

Thus, a predetermined current controlled by the first reference voltage $V_{REF1}$ is supplied to a cathode of the SPAD element 6a via a supply path Rp including the P-type transistor 11 and the P-type transistor 12. By using the above-mentioned predetermined current, the control unit 8 is capable of operating the SPAD element 6a.

When the passive circuit 10 is selected, the control unit 8 inputs a high-level selection signal Sb to a gate of a P-type transistor 22 in the active circuit 20 to be mentioned later, and further inputs a high-level selection signal Sc to a gate of a P-type transistor 23.

The control unit 8 inputs a low-level selection signal Sd to an input terminal of a NAND circuit 24. Thus, current other than the above-mentioned predetermined current is not supplied to a cathode of the SPAD element 6a.

Figure 6:
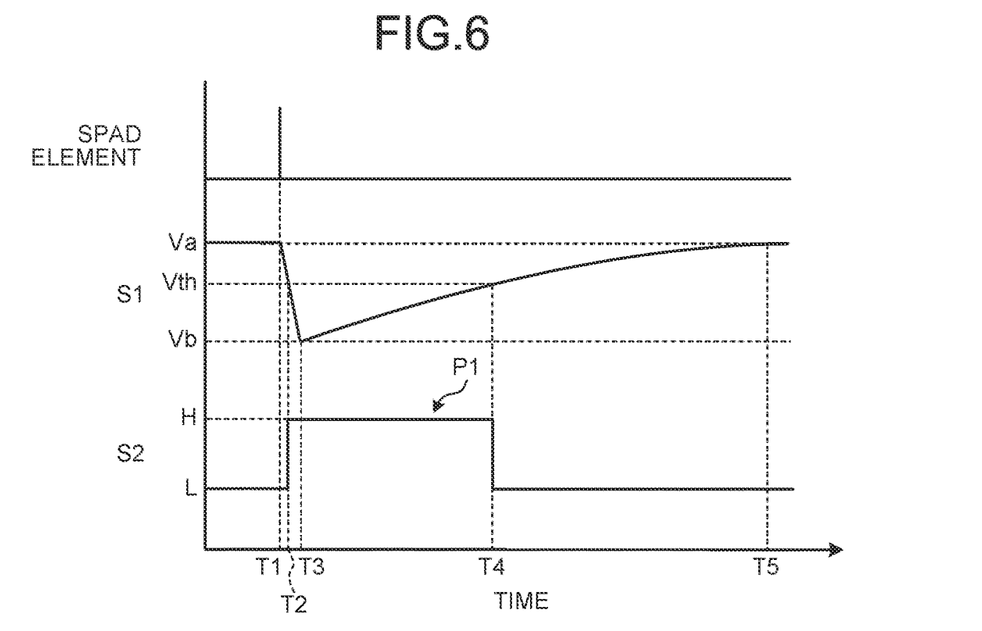
FIG. 6 is a diagram illustrating, in the form of a timing chart, operation of a passive circuit in the pulse outputting unit according to the embodiments of the present disclosure.

Next, with reference to FIG. 6 in addition to FIG. 5, operation of the passive circuit 10 will be explained. FIG. 6 is a diagram illustrating, in the form of a timing chart, operation of the passive circuit 10 in the pulse outputting unit 7 according to the embodiments of the present disclosure.

Reverse bias of a voltage Va is applied to the SPAD element 6a until it goes into a state immediately before avalanche amplification occurs, which is called Geiger mode. In other words, in an initial state, a signal S1 output from a cathode of the SPAD element 6a becomes the above-mentioned voltage Va. The voltage Va equal to or more than a threshold voltage Vth is input to the inverter 13 as the signal S1, and thus the inverter 13 outputs a low-level signal S2.

When at a time point T1, a single photon is made incident on the SPAD element 6a to which the voltage Va is applied, the SPAD element 6a is broken down and current flows into the supply path Rp. Thus, the signal S1 rapidly reduces from the voltage Va. When the signal S1 becomes smaller than the threshold voltage Vth at a time point T2, the inverter 13 out the hi level signal S2.

Avalanche amplification in the SPAD element 6a stops at a time point T3, and thus the signal S1 stops reducing at a voltage Vb. Moreover, the SPAD element 6a is recharged via the supply path Rp, and thus the signal S1 rises (i.e. quenching operation).

At a time point 14 when the signal S1 becomes equal to or more than the threshold voltage Vth, the inverter 13 outputs the low-level signal S2. Finally, the SPAD element 6a returns to the voltage Va of an initial state at a time point T5, and the SPAD element 6a and the passive circuit 10 return to respective initial states.

As described above, the passive circuit 10 converts, into a first pulse signal P1 by using the inverter 13, the signal S1 generated in the SPAD element 6a by incidence of a single photon so as to output the first pulse signal P1. The above-mentioned first pulse signal P1 is a signal having a pulse width from the time point T2 to the time point 14 in the example illustrated in FIG. 6.

As illustrated in FIG. 6, a pulse width of the first pulse signal P1 is prescribed by a recovery time interval (time point T1 to time point T5) of the SPAD element 6a. The recovery time interval of the SPAD element 6a is decided by characteristics of the SPAD element 6a (for example, capacity of element) and a value of current supplied from the supply path Rp.

When there presents incidence of a new photon during the above-mentioned recovery time interval, the SPAD element 6a is not able to detect the above-mentioned new photon. This is because when the above-mentioned new photon is made incident, avalanche amplification again occurs in the SPAD element 6a, and thus even when a new photon is made incident during the recovery time interval, the total number of pulses of the first pulse signal P1 becomes one.

In other words, a recovery time interval of the SPAD element 6a corresponds to a pulse width of the first pulse signal P1, and the above-mentioned pulse width of the first pulse signal P1 corresponds to a dead time of the SPAD element 6a.

Herein, as a value of current supplied from the supply path Rp is larger, a recovery time interval of the SPAD element 6a is shorter, on the other hand, when a value of the supplied current is too large, avalanche amplification in the SPAD element 6a ceases to stop.

Therefore, a value of current to be supplied to the SPAD element 6a from the supply path Rp in the passive circuit 10 is not set to be equal to or larger than a determined value.

In other words, when current is supplied from the passive circuit 10 to the SPAD element 6a, it is difficult to set a recovery time interval (i.e. pulse width of first pulse signal P1) of the SPAD element 6a to be equal to or shorter than a time interval decided by a current value within a range in which the SPAD element 6a is able to normally operate.

Thus, in the embodiments, the active circuit 20 is added to the pulse outputting unit 7 in order to further shorten a recovery time interval of the SPAD element 6a. Returning to FIG. 5, a circuit configuration of the above-mentioned active circuit 20 will be explained.

The active circuit 20 includes the P-type transistor 11, the inverter 13, a P-type transistor 21, the P-type transistor 22, the P-type transistor 23, the NAND circuit 24, a delay circuit 25, and a P-type transistor 26. The delay circuit 25 includes four inverters 31 to 34.

A source of the P-type transistor 21 is connected to the power source voltage Vdd, a drain of the P-type transistor 21 is connected to a source of the P-type transistor 22, and a Gate of the P-type transistor 21 is connected to the node 16. A drain of the P-type transistor 22 is connected to the signal line 15.

A source of the P-type transistor 23 is connected to the node 14, and a drain of the P-type transistor 23 is connected to the inverter 31 of the delay circuit 25.

Two input terminals of the NAND circuit 24 are connected to the node 16 and an output terminal of the inverter 34. The selection signal Sd is input to another input terminal of the NAND circuit 24.

An output terminal of the NAND circuit 24 is connected to an input terminal of the inverter 31. An output terminal of the inverter 31 is connected to an input terminal of the inverter 32. An output terminal of the inverter 32 is connected to an input terminal of the inverter 33. An output terminal of the inverter 33 is connected to an input terminal of the inverter 34.

In other words, in the active circuit 20, the NAND circuit 24 and the four inverters 31 to 34 constitute a ring oscillator.

A source of the P-type transistor 26 is connected to the power source voltage Vdd, a drain of the P-type transistor 21 is connected to the signal line 15, and a gate of the P-type transistor 21 is connected to an output terminal of the inverter 34.

Herein, when the active circuit 20 instead of the passive circuit 10 is selected, the control unit 8 inputs the low-level selection signal Sb to a gate of the P-type transistor 22. To a Gate of the P-type transistor 21 that is connected to the P-type transistor 22 in serial, the low-level signal S2 is input via the node 16 in an initial Thus, in an initial state, a predetermined current is supplied to a cathode of the SPAD element 6a by a first supply path Ra1 including the P-type transistor 21 and the P-type transistor 22. The control unit 8 is capable of operating the SPAD element 6a by using the above-mentioned predetermined current.

The control unit 8 inputs a predetermined second reference voltage $V_{REF2}$ to a gate of the P-type transistor 11, and further inputs the high-level selection signal Sa to a gate of the P-type transistor 12.

Furthermore, the control unit 8 inputs the low-level selection signal Sc to a gate of the P-type transistor 23, and further inputs the high-level selection signal Sd to an input terminal of the NAND circuit 24. A high-level signal S3 is input, in an initial state, to a gate of the P-type transistor 26.

Thus, in an initial state, current is not supplied to a cathode of the SPAD element 6a from other than the above-mentioned first supply path Ra1.

Figure 7:
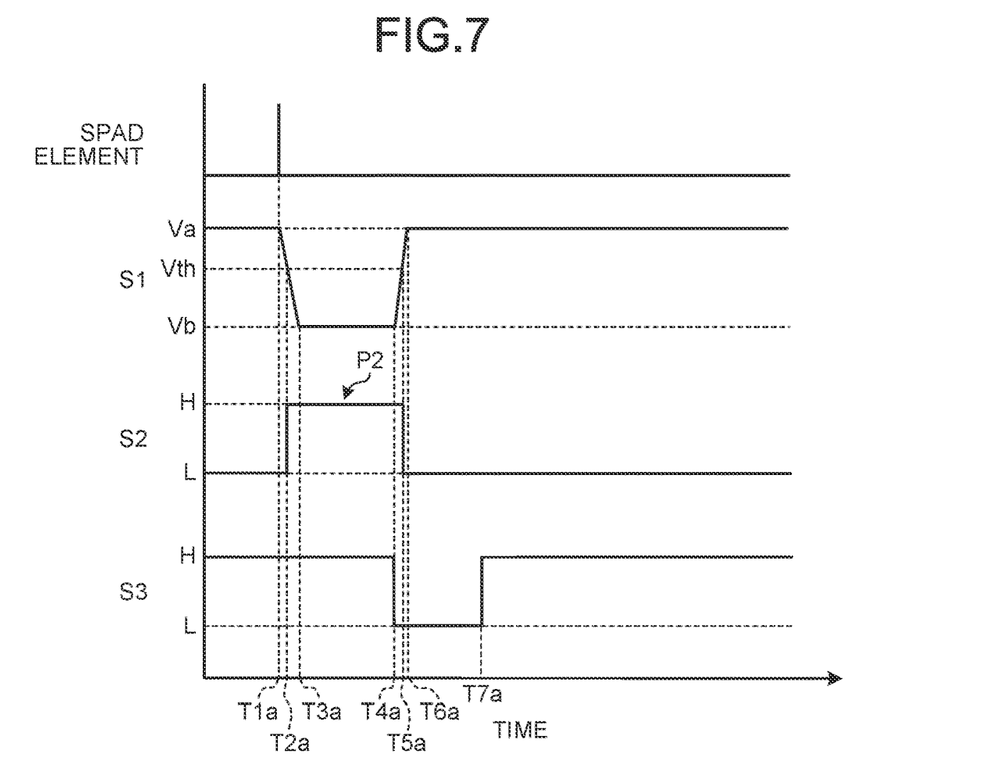
FIG. 7 is a diagram illustrating, in the form of a timing chart, operation of an active circuit in the pulse outputting unit according to the embodiments of the present disclosure.

Next, with reference to FIG. 7 in addition to FIG. 5, operation of the active circuit 20 will be explained. FIG. 7 is a diagram illustrating, in the form of a timing chart, operation of the active circuit 20 in the pulse outputting unit 7 according to the embodiments of the present disclosure.

Similarly to the passive circuit 10, also in the active circuit 20, reverse bias of the voltage Va is applied to the SPAD element 6a until it goes into a state immediately before avalanche amplification occurs. In other words, in an initial state, the signal S1 output from a cathode of the SPAD element 6a becomes the above-mentioned voltage Va.

The voltage Va equal to or more than the threshold voltage Vth is input, as the signal S1, to the inverter 13, and thus the inverter 13 outputs the low-level signal S2. The low-level signal S2 is input to the NAND circuit 24 from the inverter 13, and thus the high-level signal S3 is output from the delay circuit 25.

When a single photon is made incident on the SPAD element 6a, at a time point T1a, to which the voltage Va is applied, the SPAD element 6a is broken down and current flows into the first supply path Ra1. Thus, the signal S1 rapidly reduces from the voltage Va. When the signal S1 becomes smaller than the threshold voltage Vth at a time point T2a, the inverter 13 outputs the high-level signal S2.

Avalanche amplification stops at a time point T3a, and thus the signal S1 stops reducing at the voltage Vb. On the other hand, in the active circuit 20, the signal S2 having turned into a high level at the time point T2a is input to a gate of the P-type transistor 21, and thus the first supply path Ra1 is cut.

Thus, a cathode of the SPAD element 6a goes into a floating state being cut from the power source voltage Vdd. Therefore, the signal S1 is fixed to the voltage Vb also after the time point T3a.

Furthermore, the signal S2 having turned into a high level at the time point T2a is also input to the NAND circuit 24. At a timing of the time point T2a, the high-level selection signal Sd and the high-level signal S3 are input to the NAND circuit 24, and thus the NAND circuit 24 outputs a low-level signal.

On the basis of a low-level signal transmitted from the above-mentioned the NAND circuit 24, the delay circuit 25 outputs the low-level signal S3 at a time point T4a after the time point T2a by a predetermined delay time.

The signal S3 having turned to a low level at the above-mentioned time point T4a is input to a gate of the P-type transistor 26. Thus, the P-type transistor 26 is turned into an electric conductive state, and thus a second supply path Ra2 including the P-type transistor 26 opens in the active circuit 20.

Therefore, the SPAD element 6a is recharged via the above-mentioned second supply path Ra2 so that the signal S1 rises.

In other words, in the active circuit 20 according to the embodiments, the first supply path Ra1 and the second supply path Ra2 are provided as supply paths for supplying current to the SPAD element 6a. The first supply path Ra1 includes the P-type transistors 21 and 22 so as to supply current to the SPAD element 6a in an initial state and while avalanche amplification is occurring in the SPAD element 6a.

The second supply path Ra2 includes the P-type transistor 26 so as to supply current to the SPAD element 6a after avalanche amplification has stopped in the SPAD element 6a.

In the embodiments, it is preferable that an internal resistance of the P-type transistor 26 is set to be smaller than an internal resistance of the P-type transistor 21. In other words, in the embodiments, it is preferable that a resistance value of the second supply path Ra2 is set to be smaller than a resistance value of the first supply path Ra1.

Thus, a large current is able to be supplied to the SPAD element 6a from the second supply path Ra2 so that the SPAD element 6a is able to be recharged more rapidly than the passive circuit 10.

The second supply path Ra2 does not supply current while avalanche amplification is occurring in the SPAD element 6a. Therefore, even when an internal resistance of the P-type transistor 26 is set to be small, there presents no negative effect that avalanche amplification ceases to stop in the SPAD element 6a, for example.

Similarly to the supply path Rp of the passive circuit 10, the first supply path Ra1 may have a resistance value to be able to supply a current value within a range in which the SPAD element 6a is able to normally operate.

At a time point T5a when the signal S1 becomes equal to or more than the threshold voltage Vth, the inverter 13 outputs the low-level signal S2. Furthermore, at a time point T6a, the SPAD element 6a returns to the voltage Va in an state.

As described above, the active circuit 20 converts, by using the inverter 13, the signal S1 having been generated in the SPAD element 6a by incidence of a single photon into a second pulse signal P2 so as to output the second pulse signal P2. The above-mentioned second pulse signal P2 is a signal having a pulse width from the time point T2a up to the time point T5a in the example illustrated in FIG. 7.

The signal S2 that becomes a low level at the time point T5a is input to a gate of the P-type transistor 21. Thus, a predetermined current is supplied to a cathode of the SPAD element 6a via the P-type transistor 21 and the P-type transistor 22.

Moreover, the signal S2 that becomes a low level at the time point T5a is input also to the NAND circuit 24. Thus, the NAND circuit 24 outputs a high-level signal, and thus the delay circuit 25 outputs the high-level signal S3 at a time point Tia after the time point T5a by a predetermined delay time.

The signal S3 that becomes a high level at the time point T7a is input to a gate of the P-type transistor 26. Thus, the P-type transistor 26 becomes a cut state, and the SPAD element 6a and the active circuit 20 return to respective in states.

As described above, the active circuit 20 according to the embodiments is provided with a plurality of supply paths (first supply path Ra1 and second supply path Ra2) for supplying current to a cathode of the SPAD element 6a to be able to rapidly recover the SPAD element 6a.

Thus, a recovery time interval of the SPAD element 6a is able to be shortened, so that it is possible to shorten a dead time of the SPAD element 6a. Therefore, according to the embodiments, it is possible to enlarge a dynamic range of the distance measuring device 1.

Figure 8:
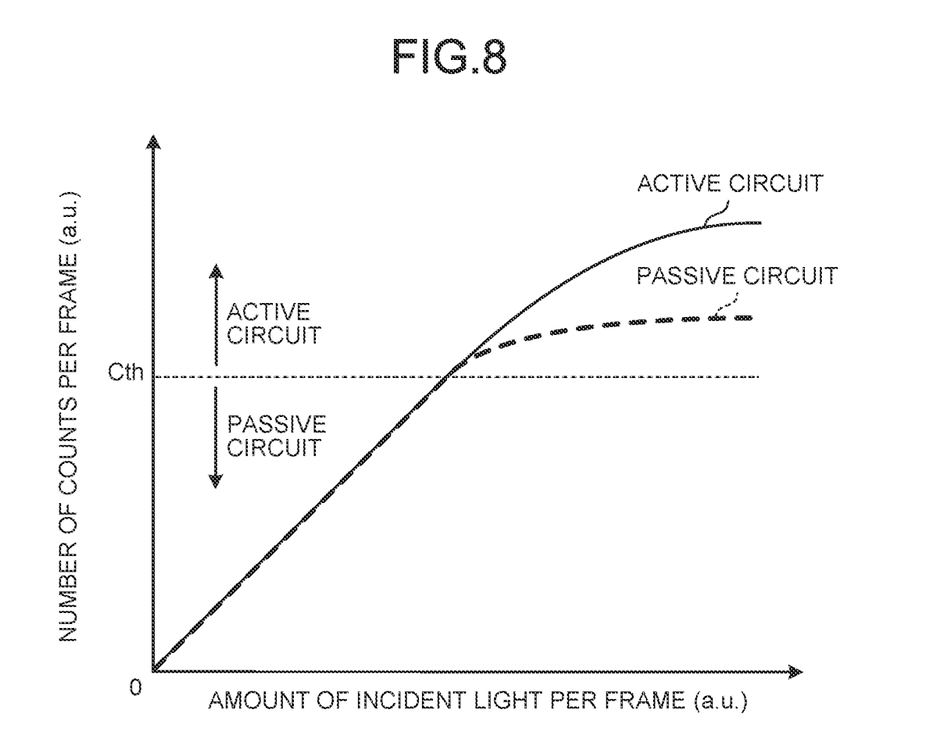
FIG. 8 is a diagram illustrating relation between amounts of incident light per frame of the passive circuit and the active circuit according to the embodiments of the present disclosure and the numbers of counts per frame.

The switching process between the passive circuit 10 and the active circuit 20 may be preferably performed by the control unit 8 in accordance with a procedure illustrated in FIG. 8. FIG. 8 is a diagram illustrating relation between amounts of incident light per frame of the passive circuit 10 and the active circuit 20 according to the embodiments of the present disclosure and the numbers of counts per frame.

As illustrated in FIG. 8, within a range in which an amount of incident light per frame with respect to the pixel array unit 6 is small, the number of counts per frame of the first pulse signal P1 output from the passive circuit 10 increases in proportion to an amount of incident light per frame.

Similarly, within a range in which an amount of incident light per frame with respect to the pixel array unit 6 is small, the number of counts per frame of the second pulse signal P2 output from the active circuit 20 increases in proportion to an amount of incident light per frame.

On the other hand, when an amount of incident light per frame with respect to the pixel array unit 6 gradually increases, the number of counts of the first pulse signal P1 output from the passive circuit 10 is saturated earlier than the number of counts of the second pulse signal P2 output from the active circuit 20. This is because when the passive circuit 10 is selected, a dead time of the SPAD element 6a is longer than that of the active circuit 20.

The control unit 8 selects the passive circuit 10 when, the number of counts is smaller than a number of threshold counts Cth just before start of the above-mentioned saturation, and selects the active circuit 20 when the number of counts is equal to or more than the number of threshold counts Cth.

Thus, even when the number of counts is equal to or more than the number of threshold counts Cth, it is possible to output the second pulse signal P2 having the number of counts according to an amount of incident light. Therefore, according to the embodiments, it is possible to enlarge a dynamic range of the distance measuring device 1.

On the other hand, a circuit configuration of the passive circuit 10 is simple, and thus power consumption thereof is lower than that of the active circuit 20. Therefore, when the number of counts is lower than the number of threshold counts Cth, the passive circuit 10 is selected so that power consumption of the pulse outputting unit 7 is able to be reduced.

For example, when the active circuit 20 is selected and the number of counts of one frame is lower than the number of threshold counts Cth, the control unit 8 may select the passive circuit 10 from the next frame.

When the passive circuit 10 is selected and the number of counts of one frame is equal to or more than the number of threshold counts Cth, the control unit 8 may select the active circuit 20 from the next frame.

In the embodiments, a pulse width of the second pulse signal P2 may be set to be shorter than a pulse width of the first pulse signal P1. Thus, when the active circuit 20 is selected, a dead time of the SPAD element 6a is able to be shortened.

Therefore, according to the embodiments, it is possible to enlarge a dynamic range of the distance measuring device 1.

Moreover, in the embodiments, a pulse width of the second pulse signal P2 may be set on the basis of a delay time of the delay circuit 25. Thus, it is possible to reduce fluctuation in a pulse width of the second pulse signal P2.

Therefore, according to the embodiments, it is possible to avoid an erroneous non-detection of the second pulse signal P2 by the control unit 8 due to an excessive reduction in a pulse width of the second pulse signal P2.

Figure 9:
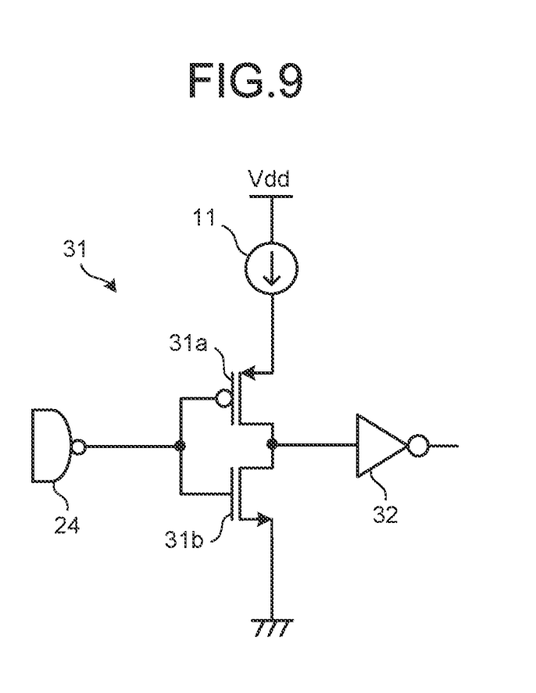
FIG. 9 is a circuit diagram illustrating a configuration example of an inverter in a delay circuit according to the embodiments of the present disclosure.

Moreover, in the embodiments, as illustrated in FIG. 9, by using the P-type transistor 11 that functions as a constant-current source, current may be supplied to the inverter 31 of the delay circuit 25. FIG. 9 is a circuit diagram illustrating a configuration example of the inverter 31 in the delay circuit 25 according to the embodiments of the present disclosure.

As illustrated in FIG. 9, the inverter 31 is configured as a CMOS circuit that is constituted of a P-type transistor 31a on an upper channel and an N-type transistor 31b on a lower channel. A source or the above-mentioned P-type transistor 31a on an upper channel is connected to the P-type transistor 11 that is a constant-current source.

Thus, a delay time from the time point T5a to the time point T7a is able to be shorten than a delay time from the time point T2a to the time point T4a illustrated in FIG. 7. In other words, a pulse width of the signal S3 is able to be shorten than a pulse width of the signal S2 (second pulse signal P2). The reason will be described below.

When the signal S2 is turned to a high level at the time point T2a, a low-level signal is input to the inverter 31 from the NAND circuit 24. Therefore, the inverter 31 outputs, to the inverter 32, a high-level signal from the P-type transistor 11 that is a constant current source via the P-type transistor 31a turned into an electric conductive state.

The second reference voltage $V_{REF2}$ is input to the P-type transistor 11 as described above, when the above-mentioned second reference voltage $V_{REF2}$ is controlled, a current amount supplied to the P-type transistor 31a is able to be limited.

Thus, in the embodiments, it is possible to extend a delay time from a time point at which a low-level signal is input to the inverter 31 until a time point at which the inverter 31 outputs a high-level signal.

On the other hand, when the signal S2 is turned to a low level at the time point T5a, a high-level signal is input to the inverter 31 from the NAND circuit 24. Therefore, the inverter 31 outputs from the ground, to the inverter 32, a low-level signal via the N-type transistor 31b turned to an electric conductive state.

Furthermore, the N-type transistor 31b is directly connected to the ground, and thus it goes into an electric conductive state more rapidly than the P-type transistor 31a. Thus, in the embodiments, it is possible to shorten a delay time from a time point at which a high-level signal is input to the inverter 31 to a time point at which the inverter 31 outputs a low-level signal.

As described above, the delay circuit 25 supplies current having a limited value to the inverter 31 at a first step to be able to shorten a pulse width of the signal S3 than a pulse width of the signal S2 (second pulse signal P2).

Thus, in the embodiments, it is possible to avoid a phenomenon where a pulse width of the second pulse signal P2 is too shortened to be detected by the control unit 8, and further to rapidly return the delay circuit 25 to an initial state.

In the embodiments, the P-type transistor 11 shares a transistor that controls current supplied to the SPAD element 6a in the passive circuit 10 and a transistor that controls current supplied to the inverter 31 in the active circuit 20.

Thus, it is possible to minimize deterioration in mismatch characteristics between the passive circuit 10 and the active circuit 20, which becomes a problem in limiting a layout of the pulse outputting unit 7. Therefore, according to the embodiments, it is possible to maximize enlargement in a dynamic range of the distance measuring device 1.

In the embodiments, an example has been described in which current having a limited value is supplied to the inverter 31 at a first step in the delay circuit 25; however, current having a limited value may be supplied to any inverter as long as the inverter (for example, inverter 33 at third step) is at an odd-numbered step.

In the embodiments, a resistance value of the second supply path Ra2 may be set to be equal to a resistance value of the first supply path Ra1, or may be set to be larger than a resistance value of the first supply path Ra1.

Modification

Figure 10:
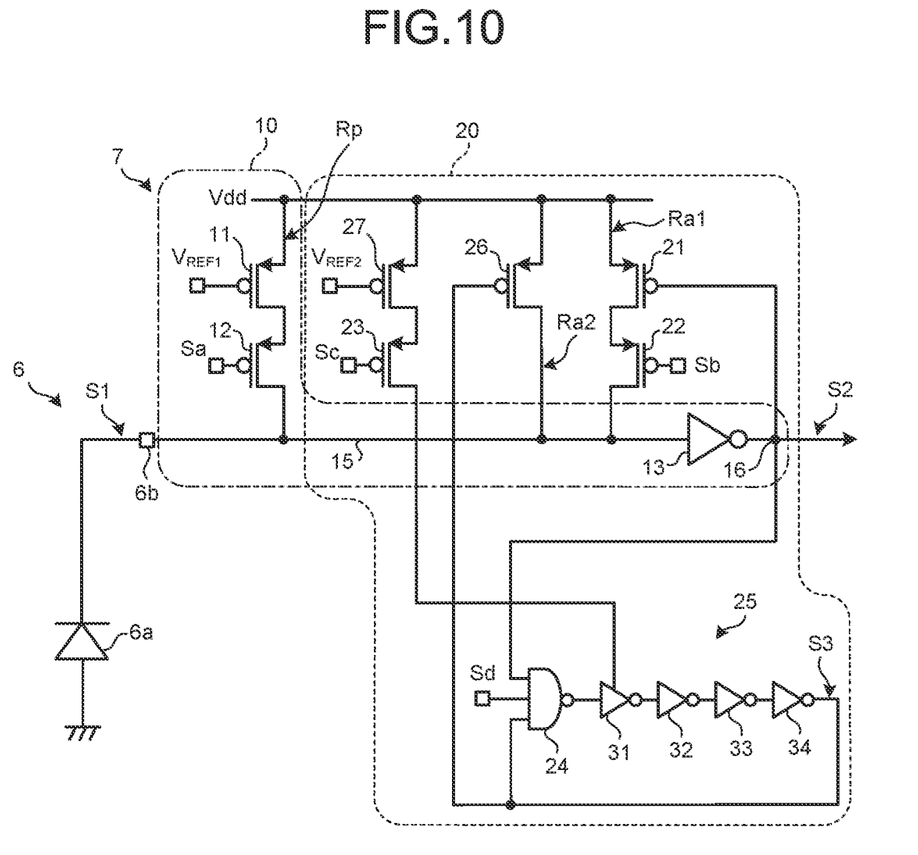
FIG. 10 is a circuit diagram illustrating a configuration example of a pulse outputting unit according to a modification of the embodiments of the present disclosure.

Next, a modification of the embodiments will be explained with reference to FIG. 10, FIG. 10 is a circuit diagram illustrating a configuration example of the pulse outputting unit 7 according to a modification of the embodiments of the present disclosure.

In the present modification, a configuration of a transistor that controls current supplied to the inverter 31 in the active circuit 20 is different from that according to the embodiments.

Specifically, in the modification, a P-type transistor 27 is additionally provided as a transistor for controlling current to be supplied to the inverter 31 in the active circuit 20.

A source of the P-type transistor 27 is connected to the power source voltage Vdd, and a drain of the P-type transistor 27 is connected to a source of the P-type transistor 23. The predetermined second reference voltage $V_{REF2}$ is input to a gate of the P-type transistor 27.

A transistor that controls current supplied to the SPAD element 6a in the passive circuit 10 is the P-type transistor 11 as well as the case of the embodiments. The predetermined first reference voltage $V_{REF1}$ is input to a gate of the above-mentioned P-type transistor 11.

According to the above-mentioned modification, as well as the case of the embodiments, when the active circuit 20 is selected, a recovery time interval of the SPAD element 6a is able to be shortened, so that it is possible to shorten a dead time of the SPAD element 6a, Therefore, according to the modification, it is possible to enlarge a dynamic range of the distance measuring device 1.

The modification is effective in a case where difference between a value of the first reference voltage $V_{REF1}$ and a value of the second reference voltage $V_{REF2}$ is large, and thus a rapid change in a gate voltage of the P-type transistor 11 is difficult.

Effects

The control circuit according to the embodiments includes the pass rive circuit 10 and the active circuit 20. The passive circuit 10 is configured to: supply current to the SPAD element 6a from the single supply path Rp; and output the first pulse signal P1 according to a signal generated in the SPAD element 6a. The active circuit 20 is configured to: supply current to the SPAD element 6a selectively from among a plurality of supply paths (first, supply path Ra1 and second supply path Ra2); and output the second pulse signal P2 according to a signal generated in the SPAD element 6a.

Thus, it is possible to enlarge a dynamic range of the distance measuring device 1.

In the control circuit according to the embodiments, a pulse width of the second pulse signal P2 is shorter than a pulse width of the first pulse signal P1.

Thus, when the active circuit 20 is selected, it is possible to shorten a dead time of the SPAD element 6a.

In the control circuit according to the embodiments, the active circuit 20 includes the first supply path Ra1 and the second supply path Ra2. The first supply path Ra1 supplies current to the SPAD element 6a while avalanche amplification is occurring in the SPAD element 6a. The second supply path Ra2 supplies current to the SPAD element 6a after avalanche amplification is stopped in the SPAD element 6a.

Thus, a recovery time interval of the SPAD element 6a is able to be shortened, so that it is possible to shorten a dead time of the SPAD element 6a.

In the control circuit according to the embodiments, a resistance value of the second supply path Ra2 is smaller than a resistance value of the first supply path Ra1.

Thus, a large current is able to be supplied from the second supply path Ra2 to the SPAD element 6a, so that it is possible to recharge the SPAD element 6a more rapidly than the passive circuit 10.

The control circuit according to the embodiments further includes the control unit 8 that controls the passive circuit 10 and the active circuit 20. The control unit 8 switches a circuit connected to the SPAD element 6a between the passive circuit 10 and the active circuit 20 in accordance with a number of counts per frame of the first pulse signal P1 or the second pulse signal P2 output from the passive circuit 10 or the active circuit 20.

Thus, it is possible to enlarge a dynamic range of the distance measuring device 1, and further to reduce power consumption of the pulse outputting unit 7.

In the control circuit according to the embodiments, the active circuit 20 includes the delay circuit 25 to output the second pulse signal P2 having a pulse width based on a delay time of the delay circuit 25.

Thus, it is possible to avoid erroneous non-detection of the second pulse signal P2 by the control unit 8.

In the control circuit according to the embodiments, the delay circuit 25 includes the inverter 31 to set the delay time based on a value of current supplied to the inverter 31.

Thus, it is possible to avoid a phenomenon where a pulse width of the second pulse signal P2 is too shortened to be detected by the control unit 8, and further to rapidly return the delay circuit 25 to an initial state.

The control circuit according to the embodiments shares a transistor that controls current supplied to the SPAD element 6a in the passive circuit 10 and a transistor that controls current supplied to the inverter 31 in the active circuit 20.

Thus, it is possible to maximize enlargement in a dynamic range of the distance measuring device 1.

While preferable embodiments of the present disclosure have been described above in detail with reference to the attached drawings, the technical scope of the present disclosure is not limited thereto. It is obvious that those skilled in the technical field of the present disclosure could have conceived of various changes or modifications within the scope of the technical ideas described in the claims, and it is understood that those changes or modifications also reasonably belong to the technical scope of the present disclosure.

Furthermore, the effects described in the present specification are merely explanations or exemplifications, and are not limiting. In other words, the techniques according to the present disclosure may exert other effects that are obvious to those skilled in the art from the descriptions of the present specification, along with the above-described effects or instead of the above-described effects.

Configurations below also belong to the technical scope of the present disclosure.

(1)

A control circuit including:
  a passive circuit configured to:
    supply current to a Single Photon Avalanche Node (SPAD) element from a single supply path; and
    output a first pulse signal according to a signal generated in the SPAD element; and
  an active circuit configured to:
    supply current to the SPAD element selectively from among a plurality of supply paths; and
    output a second pulse signal according to a signal generated in the SPAD element.

(2)

The control circuit according to (1) above, wherein
  a pulse width of the second pulse signal is shorter than a pulse width of the first pulse signal.

(3)

The control circuit according to (1) or (2) above, wherein
  the active circuit includes:

a first supply path that supplies current to the SPAD element while avalanche amplification is occurring in the SPAD element; and a second supply path that supplies current to the SPAD element after avalanche amplification is stopped in the SPAD element.

(4)

The control circuit according to (3) above, wherein a resistance value of the second supply path is smaller than a resistance value of the first supply path.

(5)

The control circuit according to any one of (1) to (4) above further including:

a control unit that controls the passive circuit and the active circuit, wherein the control unit switches a circuit connected to the SPAS element between the passive circuit and the active circuit in accordance with a number of counts per frame of one of the first pulse signal and the second pulse signal output from corresponding one of the passive circuit and the active circuit.

(6)

The control circuit according to any one of (1) to (5) above, wherein the active circuit includes a delay circuit to output the second pulse signal having a pulse width based on a delay time of the delay circuit.

(7)

The control circuit according to (6) above, wherein the delay circuit includes an inverter to set the delay time based on a value of current supplied to the inverter.

(8)

The control circuit according to (7) above, wherein the control circuit shares a transistor that controls current supplied to the SPAR element in the passive circuit and a transistor that controls current supplied to the inverter in the active circuit.

(9)

A distance measuring system including:

a light source that emits light to an object to be measured;

an SPAD element that outputs a signal when receiving light reflected from the object to be measured; and a control circuit including:

a passive circuit configured to:
supply current to an SPAD element from a single supply path; and
output a first pulse signal according to a signal generated in the SPAD element; and an active circuit configured to:
supply current to the SPAD element selectively from among a plurality of supply paths; and
output a second pulse signal according to a signal generated in the SPAD element.

(10)

The distance measuring system according to (9) above, wherein a pulse width of the second pulse signal is shorter than a pulse width of the first pulse signal.

(11)

The distance measuring system according to (9) or (10) above, wherein the active circuit includes:

a first supply path that supplies current to the SPAD element while avalanche amplification is occurring in the SPAD element; and a second supply path that supplies current to the SPAD element after avalanche amplification is stopped in the SPAD element.

(12)

The distance measuring system according to (11) above, wherein a resistance value of the second supply path is smaller than a resistance value of the first supply path.

(13)

The distance measuring system according to any one of (9) to (12) above further including:

a control unit that controls the passive circuit and the active circuit, wherein the control unit switches a circuit connected to the SPAD element between the passive circuit and the active circuit in accordance with a number of counts per frame of one of the first pulse signal and the second pulse signal output from corresponding one of the passive circuit and the active circuit.

(14)

The distance measuring system according to any one of (9) to (13) above, wherein the active circuit includes a delay circuit to output the second pulse signal having a pulse width based on a delay time of the delay circuit.

(15)

The distance measuring system according to (14) above, wherein the delay circuit includes an inverter to set the delay time based on a value of current supplied to the inverter.

(16)

The distance measuring system according to (15) above, wherein the control circuit shares a transistor that controls current supplied to the SPAD element in the passive circuit and a transistor that controls current supplied to the inverter in the active circuit.

REFERENCE SIGNS LIST

1 Distance measuring device (one example of Distance measuring system)
2 Light source unit
3 Light receiving unit
6a SPAD element
7 Pulse outputting unit
8 Control unit
10 Passive circuit
20 Active circuit
25 Delay circuit
31 Inverter
P1 First pulse signal
P2 Second pulse signal
Rp Supply path
Ra1 First supply path
Ra2 Second supply path

The invention claimed is:

1. A control circuit comprising:

a passive circuit configured to:
supply current to a Single Photon Avalanche Diode (SPAD) element from a single supply path, and
output a first pulse signal according to a signal generated in the SPAD element;

an active circuit configured to:
supply current to the SPAD element selectively from among a plurality of supply paths, and output a second pulse signal according to a signal generated in the SPAD element; and a control unit that controls the passive circuit and the active circuit, wherein the control unit switches a circuit connected to the SPAD element between the passive circuit and the active circuit in accordance with a comparison of a number of counts per frame of at least one of the first pulse signal or the second pulse signal to a threshold number.

2. The control circuit according to claim 1, wherein a pulse width of the second pulse signal is shorter than a pulse width of the first pulse signal.

3. The control circuit according to claim 1, wherein the active circuit includes:
a first supply path that supplies current to the SPAD element while avalanche amplification is occurring in the SPAD element; and
a second supply path that supplies current to the SPAD element after avalanche amplification is stopped in the SPAD element.

4. The control circuit according to claim 3, wherein a resistance value of the second supply path is smaller than a resistance value of the first supply path.

5. The control circuit according to claim 1, wherein the active circuit includes a delay circuit to output the second pulse signal having a pulse width based on a delay time of the delay circuit.

6. The control circuit according to claim 5, wherein the delay circuit includes an inverter to set the delay time based on a value of current supplied to the inverter.

7. The control circuit according to claim 6, wherein the control circuit shares a transistor that controls current supplied to the SPAD element in the passive circuit and a transistor that controls current supplied to the inverter in the active circuit.

8. A distance measuring system comprising:
a light source that emits light to an object to be measured,
a Single Photon Avalanche Diode (SPAD) element that outputs a signal when receiving light reflected from the object to be measured, and
a control circuit including:
a passive circuit configured to:
supply current to the SPAD element from a single supply path, and
output a first pulse signal according to a signal generated in the SPAD element;
an active circuit configured to:
supply current to the SPAD element selectively from among a plurality of supply paths, and
output a second pulse signal according to a signal generated in the SPAD element; and
a control unit that controls the passive circuit and the active circuit, wherein
the control unit switches a circuit connected to the SPAD element between the passive circuit and the active circuit in accordance with a comparison of a number of counts per frame of at least one of the first pulse signal or the second pulse signal to a threshold number.

9. The distance measuring system according to claim 8, wherein a pulse width of the second pulse signal is shorter than a pulse width of the first pulse signal.

10. The distance measuring system according to claim 8, wherein the active circuit includes:
a first supply path that supplies current to the SPAD element while avalanche amplification is occurring in the SPAD element; and
a second supply path that supplies current to the SPAD element after avalanche amplification is stopped in the SPAD element.

11. The distance measuring system according to claim 10, wherein a resistance value of the second supply path is smaller than a resistance value of the first supply path.

12. The distance measuring system according to claim 8, wherein the active circuit includes a delay circuit to output the second pulse signal having a pulse width based on a delay time of the delay circuit.

13. The distance measuring system according to claim 12, wherein the delay circuit includes an inverter to set the delay time based on a value of current supplied to the inverter.

14. The distance measuring system according to claim 13, wherein the control circuit shares a transistor that controls current supplied to the SPAD element in the passive circuit and a transistor that controls current supplied to the inverter in the active circuit.

15. The distance measuring system according to claim 8, wherein the control unit switches to the passive circuit when the number of counts is smaller than the threshold number, and switches to the active circuit when the number of counts is equal to or more than the threshold number.

16. The distance measuring system according to claim 15, wherein the threshold number is based upon a saturation point of the first pulse signal corresponding to an amount of incident light per frame.

17. The control circuit according to claim 1, wherein the control unit switches to the passive circuit when the number of counts is smaller than the threshold number, and switches to the active circuit when the number of counts is equal to or more than the threshold number.

18. The control circuit according to claim 17, wherein the threshold number is based upon a saturation point of the first pulse signal corresponding to an amount of incident light per frame.

* * * * *